2,965,675
ANILINE COMPOUNDS

Frederick C. Novello, Lansdale, Pa., assignor to Merck & Co., Inc., Rahway, N.J., a corporation of New Jersey No Drawing. Filed Aug. 6, 1957, Ser. No. 676,491

8 Claims. (Cl. 260—543)

This invention is concerned with novel halogen substituted aniline disulfonyl chloride compounds having the general structural formula

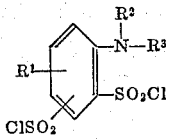

wherein $R^1$ is halogen, such as chlorine, bromine, or fluorine; $R^2$ is hydrogen or a lower alkyl radical having advantageously from 1 to 5 carbon atoms; and $R^3$ is hydrogen, a lower alkyl radical having advantageously from 1 to 5 carbon atoms, a lower alkanoyl radical advantageously a straight or branched chain alkanoyl radical having from 1 to 12 carbon atom such as the formyl, acetyl, caproyl, capryl, lauroyl, and the like radicals, mononuclear aroyl such as benzoyl or mononuclear aryl-lower alkanoyl having advantageously from 1 to 3 carbon atoms in the alkanoyl moiety such as phenylacetyl, phenylpropionyl, cinnamoyl, and the like radicals.

The new compounds of this invention are useful intermediates in the preparation of halogen substituted disulfamylaniline compounds which possess diluretic and/or natriuretic properties which, in turn, also can be converted into halogen substituted benzothiadiazine-1,1-dioxide compounds which also possess diuretic and/or natriuretic properties. The conversion of the novel halogen substituted aniline disulfonyl chloride compounds of this invention to the corresponding halogen substituted disulfamylaniline compounds is described in my copending U.S. patent application, Serial No. 638,701 and also in my copending U.S. patent application, Serial No. 582,082, and the conversion of the novel halogen substituted aniline disulfonyl chloride compounds to the corresponding benzothiadiazine-1,1-dioxide compounds also is described in my copending U.S. patent application, Serial No. 582,082. This application is a continuation-in-part of each of the applications identified above, Serial No. 582,082, filed by myself May 2, 1956, and Serial No. 638,701 filed by myself February 7, 1957, which latter application also is a continuation-in-part of Serial No. 582,082. U.S. patent application, Serial No. 582,082 issued as Patent No. 2,809,194.

The halogen substituted aniline disulfonyl chloride compounds of this invention are prepared by the chlorosulfonation of the selected halogen substituted aniline compounds, preferably in the presence of an alkali metal halide, for example, sodium potassium or lithium chloride. For all practical purposes, sodium chloride can be used as it is readily available, cheap, and in its presence the reaction proceeds quite smoothly. As the reaction between these ingredients generally is quite vigorous, it is preferred to add the halogen substituted aniline compound to the chlorosulfonic acid dropwise with stirring and cooling. After all of the aniline compound has been added, the alkali metal halide is added in small portions to allow for the evolution of hydrogen halide at a moderate rate. Following this, the mixture is heated at between about 100–200° C. preferably in an oil bath.

The disulfonyl chloride compound thus obtained then can be acylated with an organic acid chloride or anhydride, the acid advantageously being selected from a lower alkanoic acid such as acetic acid, propionic acid, caproic acid, capric acid, lauric acid and the like, or a mononuclear aryl-monocarboxylic acid such as benzoic acid, or a mononuclear aryl-lower alkanoic acid such as phenylacetic acid, phenylpropionic acid, and the like. This reaction proceeds quite smoothly with moderate heating on the steam bath yielding the N-acylaniline-disulfonyl chloride compound.

The halogen substituted aniline disulfonyl chloride compounds of this invention can be converted to the corresponding halogen substituted disulfamylaniline compounds and to the benzothiadiazine-1,1-dioxide compounds by the methods described in detail in my copending U.S. patent applications identified above. In general, the halogen substituted aniline disulfonyl chloride compounds can be converted by known methods to the corresponding disulfamylaniline compounds by treatment with ammonia or a primary or a secondary amine. The benzothiadiazine-1,1-dioxide compound is prepared by heating the halogen substituted disulfamylaniline compound with formic acid or with ethylorthoformate at between about 100–250° C., after which the solvent can be removed, preferably by distillation, thus forming the desired product.

The preparation of the halogen substituted aniline disulfonyl chloride compound of this invention is more fully described in the following examples. It is to be understood, however, that the examples are illustrative of the compounds embraced by this invention and of the methods for their preparation and are not to be construed as limiting the invention to the particular compounds or methods specifically described.

EXAMPLE 1

*5-chloroaniline-2,4-disulfonyl chloride* m-Chloroaniline (64 g., 0.5 mole) is added dropwise with stirring to 375 ml. of chlorosulfonic acid in a 3 liter, round bottom, three-necked flask, cooled in an ice bath. Sodium chloride (350 g.) is added portionwise over a period of 1–2 hours and the mixture then heated gradually in an oil bath to 150° C. After 3 hours at 150–160° C., the flask is cooled thoroughly in an ice bath and the contents treated with a liter of cold water. The product is extracted with ether and the extract washed with water and dried over sodium sulfate. After removal of ether on the steam bath, the residual 5-chloroaniline-2,4-disulfonyl chloride is crystallized from benzene-hexane, M.P. 130–132° C.

The product obtained by the process described in Example 1 can be converted to the corresponding disulfamylaniline compound by the following method. The 5-chloroaniline-2,4-disulfonyl chloride, obtained as described in Example 1, is cooled in an ice bath and treated with 150 ml. of 28% ammonium hydroxide in a 2 liter Erlenmeyer flask. The mixture is heated on the steam bath for 1 hour, cooled, and the product collected on the filter, washed with water, and dried. Upon crystallization from dilute alcohol, 5-chloro-2,4-disulfamylaniline is obtained as colorless needles, M.P. 251–252° C.

The corresponding benzothiadiazine-1,1-dioxide is prepared as follows: A solution of 88 g. of the 5-chloro-2,4-disulfamylaniline obtained as described above in 1.1 liter of 88% formic acid is heated under reflux for 2 hours. After removal of 200 ml. of solvent by distillation, 1 liter of water is added and the product collected, washed with water, and dried. Crystallization from dilute alcohol affords 6-chloro-7-sulfamyl-1,2,4-benzothiadiazine-1,1-dioxide as colorless needles, M.P. 342.5–343° C.

EXAMPLE 2

6-chloroaniline-2,4-disulfonyl chloride o-Chloroacetanilide (15.2 g.) is added portionwise to 120 ml. of chlorosulfonic acid at room temperature followed by portionwise addition of 100 g. of sodium chloride over 1 hour. The mixture then is heated gradually to 150° C. in an oil bath over a ½ hour period and then maintained at 150° C. for 2 hours. After cooling thoroughly in an ice bath, the reaction mixture is treated with 500 ml. of ice water and the product taken up in ether and washed with water and dried over sodium sulfate. The ether then is removed by evaporation on the steam bath yielding 6-chloroaniline-2,4-disulfonyl chloride, M.P. 134–135° C.

The 6-chloroaniline-2,4-disulfonyl chloride thus obtained is converted to the corresponding disulfamyl compound by the method described above to yield 6-chloro-2,4-disulfamylaniline as colorless needles, M.P. 242–244° C.

EXAMPLE 3

5-bromoaniline-2,4-disulfonyl chloride m-Bromoaniline (86 g., 0.5 mole) is added dropwise over a period of 1 hour to 375 ml. of chlorosulfonic acid, cooled in an ice bath. Sodium chloride (350 g.) is added portionwise over 2 hours and the mixture then heated in an oil bath at 150° C. for 3 hours. After thorough cooling in an ice bath, the reaction mixture is treated with 1 liter of ice water. The product is taken up in ether, washed with water, and dried, and the ether then is removed on the steam bath yielding 5-bromoaniline-2,4-disulfonyl chloride.

The disulfonyl chloride thus obtained is converted to the corresponding disulfamylaniline compound by the method described above yielding 5-bromo-2,4-disulfamylaniline as colorless needles, M.P. 265–267° C.

The corresponding benzothiadiazine-1,1-dioxide is obtained by treating the 5-bromo-2,4-disulfamylaniline compound by the method described above to yield 6-bromo-7-sulfamyl-1,2,4-benzothiadiazine-1,1-dioxide as colorless needles, M.P. 347–349° C. with decomposition (sample inserted at 250° C.).

EXAMPLE 4

4-chloroaniline-2,5-disulfonyl chloride

By replacing the m-bromoaniline employed in Example 3 by an equimolecular quantity of 5-amino-2-chlorobenzenesulfonic acid, and following substantially the same procedure described in Example 3, there is obtained 4-chloroaniline-2,5-disulfonyl chloride.

The disulfonyl chloride thus obtained is converted to the corresponding disulfamyl compound by the method described above yielding 4-chloro-2,5-disulfamylaniline as colorless needles, M.P. 289–290° C.

The disulfamylaniline compound is converted to the corresponding benzothiadiazine by substantially the same method as described above to give 7-chloro-6-sulfamyl-1,2,4-benzothiadiazine-1,1-dioxide as colorless plates from acetone-petroleum ether, M.P. 327–330° C. (dec.).

EXAMPLE 5

5-chloroacetanilide-2,4-disulfonyl chloride

A solution of 5 g. of 5-chloroaniline-2,4-disulfonyl chloride, prepared as described in Example 1, in 15 ml. of acetic anhydride is allowed to stand at room temperature for 45 minutes. The reaction mixture then is cooled and the crystalline product which precipitates separated by filtration yielding 5-chloroacetanilide-2,4-disulfonyl chloride.

The disulfonyl chloride thus obtained is converted to N-acetyl-5-chloro-2,4-disulfamylaniline by the method described above and then to the benzothiadiazine, also by the method described above, yielding 6-chloro-3-methyl-7-sulfamyl-1,2,4-benzothiadiazine-1,1-dioxide as colorless needles, M.P. 332–333° C. (dec.).

EXAMPLE 6

N-benzoyl-5-chloroaniline-2,4-disulfonyl chloride

A solution of 6.6 g. of 5-chloroaniline-2,4-disulfonyl chloride, prepared as described in Example 1, in 10 ml. of benzoyl chloride is allowed to stand at room temperature for 17 hours. The crystalline product then is collected, washed with a small amount of benzene and crystallized from benzenehexane to give N-benzoyl-5-chloroaniline-2,4-disulfonyl chloride as colorless needles, M.P. 171–173° C. (dec.).

The disulfonyl chloride thus obtained is converted to the disulfamyl derivative by the method described above to give N-benzoyl-5-chloro-2,4-disulfamylaniline, M.P. 266° C. (dec.).

The N-benzoyl-5-chloro-2,4-disulfamylaniline then is heated at 200° C. for 2 hours, cooled and dissolved in 50 ml. of 5% aqueous sodium hydroxide and filtered. After acidification of the filtrate with dilute hydrochloric acid, the product is collected, washed with water, and recrystallized from a dimethylformamide-water mixture. 6-chloro-3-phenyl-7-sulfamyl-1,2,4-benzothiadiazine-1,1-dioxide thus is obtained as colorless flakes, M.P. greater than 350° C.

EXAMPLE 7

N-butyryl-5-chloroaniline-2,4-disulfonyl chloride

A solution of 5.4 g. of 5-chloroaniline-2,4-disulfonyl chloride, prepared as described in Example 1, in a mixture of 10 ml. of butyric anhydride and 10 ml. of benzene is allowed to stand at room temperature for 1 hour. After cooling in an ice bath, the crystalline product is collected and crystallized from benzene-hexane to give N-butyryl-5-chloroaniline-2,4-disulfonyl chloride as colorless needles, M.P. 121–122° C.

The disulfonyl chloride thus obtained is converted to the corresponding N-butyryl-5-chloro-2,4-disulfamylaniline and then to the 6-chloro-3-propyl-7-sulfamyl-1,2,4-benzothiadiazine-1,1-dioxide by the methods described above, the latter compound being obtained in the form of colorless needles, M.P. 302.5–303.5° C.

EXAMPLE 8

N-caproyl-5-chloroaniline-2,4-disulfonyl chloride 5-chloroaniline-2,4-disulfonyl chloride (5 g.), prepared as described in Example 1, is dissolved in 10 ml. of n-caproic anhydride by warming gently on the steam bath and the reaction mixture then allowed to stand at room temperature for 2 hours. The crystalline product thus formed is collected and recrystallized from hexane to give N-caproyl-5-chloroaniline-2,4-disulfonyl chloride as colorless needles, M.P. 91–93° C.

The disulfonyl chloride compound thus obtained is converted to the corresponding N-caproyl-5-chloro-2,4-disulfamylaniline compound and then to the 3-amyl-6-chloro-7-sulfamyl-1,2,4-benzothiadiazine-1,1-dioxide by the methods described above, the latter compound being obtained in the form of colorless plates, M.P. 269–270° C.

EXAMPLE 9

N-methyl-5-chloroaniline-2,4-disulfonyl chloride

By replacing the m-chloroaniline employed in Example 1 by an equimolecular quantity of N-methyl-m-chloroaniline and following substantially the same procedure as described in Example 1, there is obtained N-methyl-5-chloroaniline-2,4-disulfonyl chloride.

The disulfonyl chloride thus obtained can be converted by the processes described above to the corresponding N-methyl-5-chloro-2,4-disulfamylaniline and 6-chloro-4-methyl-7-sulfamyl-1,2,4-benzothiadiazine-1,1-dioxide.

EXAMPLE 10

5-fluoroaniline-2,4-disulfonyl chloride

By replacing the m-chloroaniline employed in Example 1 by an equimolecular quantity of m-fluoroaniline and following substantially the same procedure described in Example 1 there is obtained 5-fluoroaniline-2,4-disulfonyl chloride.

The disulfonyl chloride thus obtained can be converted to the corresponding 5-fluoro-2,4-disulfamylaniline and then to the 6-fluoro-7-sulfamyl-1,2,4-benzothiadiazine-1,1-dioxide by the methods described above.

EXAMPLE 11

N-phenylacetyl-5-fluoroaniline-2,4-disulfonyl chloride

The 5-fluoroaniline-2,4-disulfonyl chloride obtained as described in Example 10 is dissolved in phenylacetyl chloride and allowed to stand at room temperature for 17 hours. The product is collected, washed with benzene, yielding N-phenylacetyl - 5 - fluoroaniline - 2,4 - disulfonyl chloride.

The disulfonyl chloride thus obtained is converted to the corresponding N-phenylacetyl-5-fluoro-2,4-disulfamylaniline compound and to the 3-benzyl-6-fluoro-7-sulfamyl-1,2,4-benzothiadiazine-1,1-dioxide by the methods described above.

EXAMPLE 12

N,N-di-n-propyl-5-chloroaniline-2,4-disulfonyl chloride

By replacing the m-chloroaniline employed in Example 1 by an equimolecular quantity of N,N-di-n-propyl-m-chloroaniline, and following substantially the same procedure described in Example 1, there is obtained N,N-di-n-propyl-5-chloroaniline-2,4-disulfonyl chloride.

The disulfonyl chloride obtained as described in Example 12 can be converted by the method described above to the corresponding N,N-di-n-propyl-5-chloro-2,4-disulfamylaniline.

EXAMPLE 13

N-methyl-5-chloroacetanilide-2,4-disulfonyl chloride

By replacing the 5-chloroaniline-2,4-disulfonyl chloride employed in Example 5 by an equimolecular quantity of N-methyl-5-chloroaniline-2,4-disulfonyl chloride (prepared as described in Example 9) and following substantially the same process described in Example 5, there is obtained N-methyl - 5 - chloroacetanilide - 2,4 - disulfonyl chloride.

The disulfonyl chloride thus obtained can be converted by the methods described above to the corresponding N-acetyl-N-methyl-5-chloro-2,4-disulfamylaniline and to the 6-chloro-3,4-dimethyl-7-sulfamyl-1,2,4-benzothiadiazine-1,1-dioxide.

EXAMPLE 14

N-benzoyl-N-methyl-5-chloroaniline-2,4-disulfonyl chloride

By replacing the 5-chloroaniline-2,4-disulfonyl chloride employed in Example 6 by an equimolecular quantity of N-methyl-5-chloroaniline-2,4-disulfonyl chloride (prepared as described in Example 9) and following substantially the same procedure described in Example 6 there is obtained N - benzoyl - N-methyl-5-chloroaniline-2,4-disulfonyl chloride.

The disulfonyl chloride thus obtained can be converted by the methods described in the paragraphs immediately following Example 6 to the corresponding N-benzoyl-N-methyl-5-chloro-2,4-disulfamylaniline and to the 6-chloro-4-methyl-3-phenyl-7-sulfamyl - 1,2,4-benzothiadiazine-1,1-dioxide.

While the above examples describe the preparation of certain compounds illustrated by the structure on page 1, it is to be understood that the invention is not to be limited by these examples or by the specific reaction conditions described for the preparation of the compounds but is to be understood to embrace variations and modifications falling within the scope of the appended claims.

What is claimed is:

1. An aniline disulfonyl chloride compound having the general structure

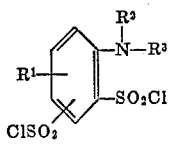

wherein $R^1$ is a halogen; $R^2$ is selected from the group consisting of hydrogen and a lower alkyl radical; and $R^3$ is selected from the group consisting of hydrogen, lower alkyl, lower alkanoyl, phenylacetyl and benzoyl radicals.

2. An aniline disulfonyl chloride compound having the general structure

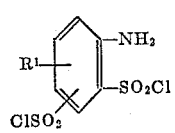

wherein $R^1$ is a halogen.

3. 5-chloroaniline-2,4-disulfonyl chloride.
4. 6-chloroaniline-2,4-disulfonyl chloride.
5. An aniline disulfonyl chloride compound having the general structure

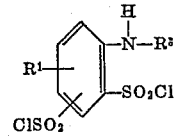

wherein $R^1$ is a halogen; and $R^3$ is a lower alkanoyl radical.

6. N-caproyl-5-chloroaniline-2,4-disulfonyl chloride.

7. An aniline disulfonyl chloride compound having the general structure

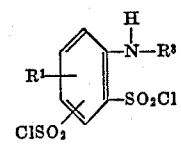

wherein $R^1$ is a halogen; and $R^3$ is a benzoyl radical.

8. An aniline disulfonyl chloride compound having the general structure

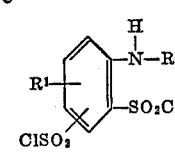

wherein $R^1$ is a halogen; and $R^3$ is the phenylacetyl radical.

References Cited in the file of this patent

UNITED STATES PATENTS

| | | |
|---|---|---|
| 1,911,719 | Schweitzer et al. | May 20, 1933 |
| 1,939,025 | Schweitzer | Dec. 12, 1933 |

OTHER REFERENCES

Lustig et al.: Monatshefte für Chemie, vol. 48, pp. 87–98 (1927).